United States Patent
Ljung et al.

(10) Patent No.: US 11,265,356 B2
(45) Date of Patent: Mar. 1, 2022

(54) NETWORK ASSISTANCE FUNCTIONS FOR VIRTUAL REALITY DYANMIC STREAMING

(71) Applicant: SONY CORPORATION, Tokyo (JP)

(72) Inventors: Rickard Ljung, Lund (SE); Peter Karlsson, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/967,053

(22) PCT Filed: Feb. 20, 2019

(86) PCT No.: PCT/US2019/018678
§ 371 (c)(1),
(2) Date: Aug. 3, 2020

(87) PCT Pub. No.: WO2019/164873
PCT Pub. Date: Aug. 29, 2019

(65) Prior Publication Data
US 2021/0051189 A1    Feb. 18, 2021

(30) Foreign Application Priority Data

Feb. 22, 2018   (SE) .................................. 1830058-2

(51) Int. Cl.
| | | |
|---|---|---|
| G06F 15/16 | (2006.01) | |
| H04L 65/60 | (2022.01) | |
| G06T 19/00 | (2011.01) | |
| H04L 65/612 | (2022.01) | |
| H04L 65/613 | (2022.01) | |

(52) U.S. Cl.
CPC .......... *H04L 65/602* (2013.01); *G06T 19/006* (2013.01); *H04L 65/4084* (2013.01); *H04L 65/4092* (2013.01)

(58) Field of Classification Search
CPC .............. H04L 65/602; H04L 65/4084; H04L 65/4092
See application file for complete search history.

(56) References Cited

U.S. PATENT DOCUMENTS

| | | |
|---|---|---|
| 2015/0346812 A1 | 12/2015 | Cole et al. |
| 2017/0093942 A1 | 3/2017 | Danielsson et al. |

FOREIGN PATENT DOCUMENTS

| | | |
|---|---|---|
| WO | 2016191694 A1 | 12/2016 |
| WO | 2018021950 A1 | 2/2018 |

OTHER PUBLICATIONS

Yong, He et al., Dash Sand Signaling for Data Prefetching and Caching, MPEG Meeting, Jul. 17, 2017-Jul. 21, 2017, No. m41121, Jul. 11, 2017, 3 pages.

(Continued)

*Primary Examiner* — Ryan J Jakovac
(74) *Attorney, Agent, or Firm* — Tucker Ellis LLP

(57) ABSTRACT

Network assistance is provided for the streaming of multi-segment data from a data source (12) to a streaming client (54) in a network. The network assistance for multi-segment data streaming may be carried out in an automated manner by the respective devices. The systems and methods include new functions that allow for more efficient handling of data segments that make up a data stream. The network assistance for multi-segment streaming may improve, for example, virtual reality (VR) streaming performance.

15 Claims, 5 Drawing Sheets

(56) References Cited

OTHER PUBLICATIONS

3rd Generation Partnership Project; Technical Specification Group Services and System Aspects; Study on Server and Network-assisted DASH (Sand) for 3GPP Multimedia Services (Release 14), Nov. 8, 2016, pp. 1-44.
International Search Report and Written Opinion from corresponding International Application No. PCT/US2019/018678, dated Apr. 29, 2019, 13 pages.
Intel, "SAND Support in 3GPP DASH", 3rd Generation Partnership Project (3GPP), Jun. 26-30, 2017, Sophia Antipolis, France, S4-170732, 29 pages.
Zhao, Shuai, et al., "SDN-Assisted Adaptive Streaming Framework for Tile-Based Immersive Content Using MPEG-DASH", IEEE Conference on Network Function Virtualization and Software Defined Networks (NFV-SDN), Nov. 6, 2017, 6 pages.

NETWORK ASSISTANCE FUNCTIONS FOR VIRTUAL REALITY DYANMIC STREAMING

RELATED APPLICATION DATA

This applications claims the benefit of Swedish Patent Application No. 1830058-2, filed Feb. 22, 2018, the disclosure of which is incorporated herein by reference in its entirety.

TECHNICAL FIELD OF THE INVENTION

The technology of the present disclosure relates generally to wireless communications among electronic devices in a network environment and, more particularly, to methods of providing and employing network assistance during dynamic streaming of data containing multiple segments, and related devices.

BACKGROUND

In a network, such as a cellular or mobile network, a client may receive streaming data content that includes multiple data segments. Each data segment may correspond to data which represents a period of time for the streaming data. Further, multiple segments available at the streaming data source may represent the same period of time, but may represent different versions of the content for the given time period. A client requesting segments from the video source may request multiple segments to be transmitted via the network. Hence, the data stream from the source to the client may consist of multiple segments being transmitted simultaneously or at least in close connection to each other. Transmitting each data segment in the network requires a portion of the available system capacity even though some segments may be more important than others based on the needs of the client.

Exemplary problems that arise with such a multi-segment data stream can be seen in the implementation of a virtual reality (VR) data stream. One problem is that the VR stream can contain multiple segments representing the same time period, but having different importance depending on a user's field of view. In this situation, a low priority VR stream segment would potentially use valuable bandwidth that would be more effectively utilized with a higher priority segment. This may lead to stalling of media playback in the users field of view and dissatisfaction in the viewer experience. It will be appreciated that other issues and technical implementation challenges may be addressed by the disclosed techniques. There exists a need to improve multi-segment data streaming through a cellular or mobile network.

SUMMARY

Disclosed are features that may enhance the quality of experience (QoE) of data streaming services in situations where the data includes a plurality of data segments. The disclosed features may improve the QoE specifically when operating on a network where transmission capability is varying over time, and/or where spectrum resources are shared among multiple users, for example in a wireless mobile or cellular network according to any appropriate set of standards such as those promulgated by 3GPP.

According to one aspect of the disclosure, a method of streaming data with a streaming client comprises establishing a network assistance (NA) session with a network element for streaming data from a data source; receiving data from the data source, the data comprising a plurality of data segments; assigning relative priorities indicative of at least two different transmission priorities to at least two different data segments of the plurality of data segments; and informing the network element of the relative priorities.

According to one embodiment of the method, the method further comprises receiving a network assistance response that comprises information indicative of recommended rates for one or more of the relative priorities.

According to one embodiment of the method, the method further comprises requesting, from the data source, the at least two different data segments corresponding to the respective recommended rates.

According to one embodiment of the method, the method further comprises assigning a highest priority indicative of a highest priority request for an upcoming data segment reception.

According to one embodiment of the method, the method further comprises receiving a recommended rate for the upcoming data segment.

According to one embodiment of the method, the method further comprises receiving an acknowledgement message indicating whether the recommended rate for the upcoming data segment was assigned as a highest available rate by the network element in response to the highest priority request.

According to one embodiment of the method, the method further comprises receiving information specifying an allocation of network resources dedicated for at least one of communication with the network element or downloading the data.

According to one embodiment of the method, the information specifying an allocation of network resources comprises at least one of an access point name, a quality of service indicator, an IP address, a mobile cell ID, or a radio access technology.

According to one embodiment of the method, the network element is configured to provide a NA service that supports network assistance under dynamic adaptive streaming over hypertext transfer protocol (HTTP) (DASH), the network element being a DASH-aware network element (DANE).

According to one embodiment of the method, the NA service uses standard server and network assisted DASH (SAND) message envelopes.

According to one embodiment of the method, the data represents a virtual reality (VR) environment (78), and each segment of the plurality of segments represents a tile (80) of the VR environment.

According to one embodiment of the method, the relative priorities are assigned based on a user's field of view (FOV) with respect to the VR environment.

According to one embodiment of the method, assigning relative priorities to the at least two different segments comprises assigning a first priority to an in-FOV tile and/or a second priority to a peripheral FOV tile, and/or a third priority to an out of FOV tile.

According to one embodiment of the method, the first priority corresponds with a first recommended rate, the second priority corresponds with a second recommended rate, and the third priority corresponds with a third recommended rate, wherein the first recommended rate corresponds to higher quality video than the second recommended rate, and the second recommended rate corresponds to higher quality video than the third recommended rate.

According to another aspect of the disclosure, a method of providing network assistance (NA) by a network element during streaming of data from a data source to a streaming client, comprises establishing a network assistance (NA) session with the streaming client; receiving from the streaming client a network assistance request that comprises relative priorities pertaining to at least two different segments of data; and responding to the streaming client with a network assistance response that provides a recommended rate for at least one of the relative priorities.

According to one embodiment of the method, the method further comprises receiving a highest priority request for an upcoming data segment.

According to one embodiment of the method, the method further comprises responding to the highest priority request with a recommended rate for the upcoming data segment.

According to one embodiment of the method, responding to the high priority request includes sending an acknowledgement message indicating whether the recommended rate for the upcoming data segment was assigned as a highest available rate in response to the highest priority request.

According to one embodiment of the method, the method further comprises providing the streaming client with information specifying an allocation of network resources dedicated for at least one of communication with the network element or downloading the data.

According to one embodiment of the method, the information specifying an allocation of network resources comprises at least one of an access point name, a quality of service indicator, an IP address, a mobile cell ID, or a radio access technology.

According to one embodiment of the method, the network element is configured to provide a NA service that supports network assistance under dynamic adaptive streaming over hypertext transfer protocol (HTTP) (DASH), the network element being a DASH-aware network element (DANE).

According to one embodiment of the method, the NA service uses standard server and network assisted DASH (SAND) message envelopes.

According to one embodiment of the method, the data represents a virtual reality (VR) environment, and each segment of the one or more segments represents a tile of the VR environment.

According to one embodiment of the method, the relative priorities correspond to a user's field of view (FOV) with respect to the VR environment.

According to one embodiment of the method, the recommended rates associate a first recommended rate with an in field of view (FOV) tile, and/or a second recommended rate with a peripheral FOV tile, and/or a third recommended rate to an out of FOV tile, wherein the first recommended rate corresponds to higher quality video than the second recommended rate, and the second recommended rate corresponds to higher quality video than the third recommended rate.

DETAILED DESCRIPTION OF EMBODIMENTS

A. Introduction

Figure 1:
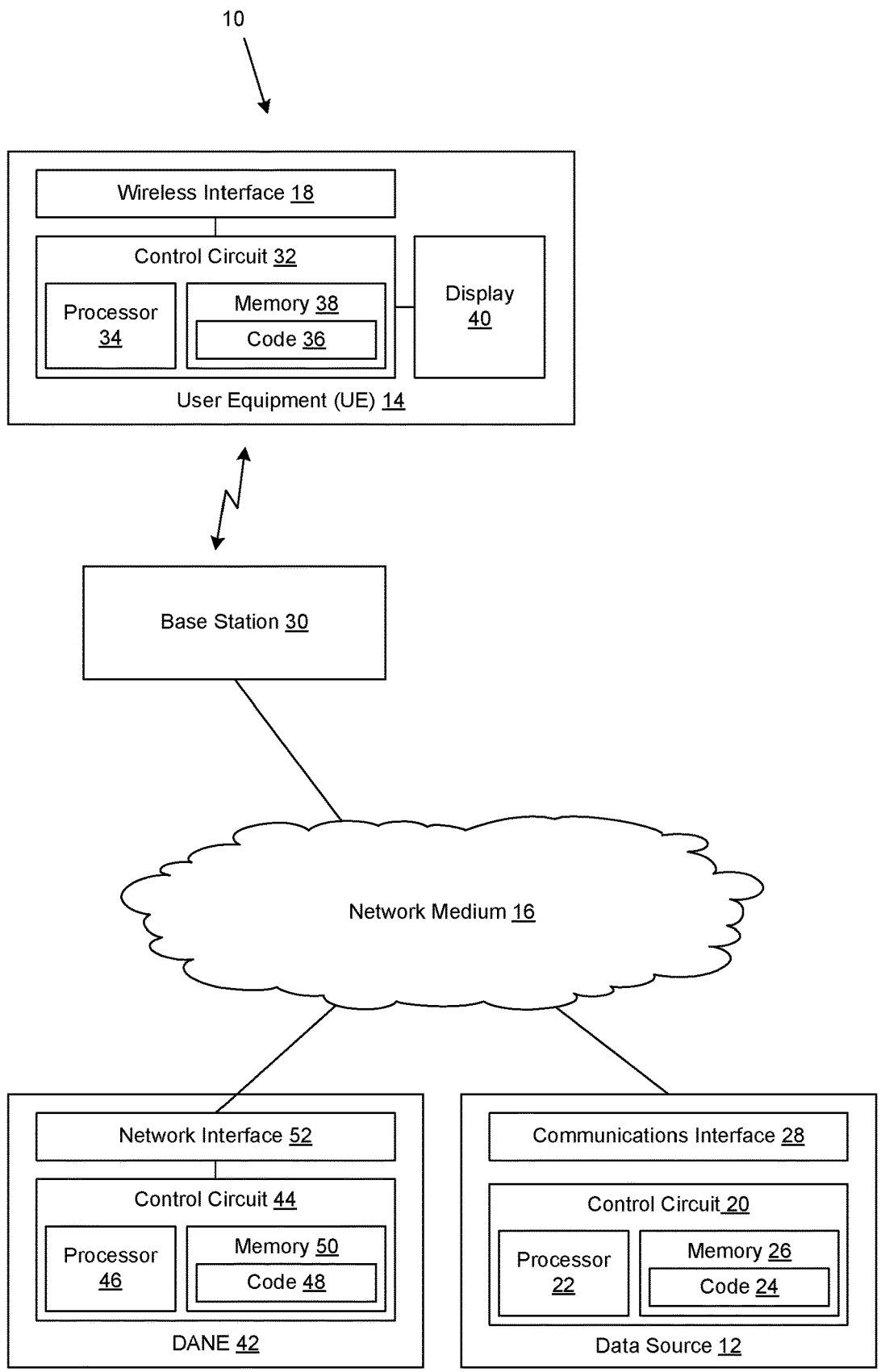
FIG. 1 is a schematic block diagram of a representative network system that conducts network assistance for multi-segment data streaming.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments. Functions as described in the different devices or units in the figures may in other embodiments be implemented in other devices or units.

Described below, in conjunction with the appended figures, are various embodiments of systems and methods for conducting wireless radio communications that include network assistance for multi-segment data streaming. The network assistance for multi-segment data streaming may be carried out in an automated manner by the respective devices. The network assistance for multi-segment streaming may improve, for example, virtual reality (VR) streaming performance.

B. System Architecture

FIG. 1 is a schematic diagram of an exemplary network system 10 for implementing the disclosed techniques. It will be appreciated that the illustrated system is representative and other systems may be used to implement the disclosed techniques. The exemplary network system 10 includes a data source 12 for hosting and providing a data stream to a user equipment (UE) 14. The data source 12 typically will be a server or other device located on a network and/or managed by a content provider. The data source 12 may be accessed through such a network such as the Internet, by means such as wired communications or wireless communications including, but not limited to, a cellular data network.

The UE 14 transmits and receives data and control signaling via a base station 30 or other access point that operates in accordance with a cellular or mobile device network protocol such as, but not limited to a protocol promulgated by the $3^{rd}$ Generation Project Partnership (3GPP). An exemplary base station 30 may be a long term evolution (LTE) base station, often referred to as an enhanced Node B (eNodeB or eNB). The base station 30 services one or more electronic devices, including the UE 14. The base station 12 may support communications between the electronic devices and a network medium 16 through which the electronic devices may communicate with other electronic devices, servers, which can be connected within the operator's core network, or via the Internet, etc. One device that the UE 14 may communicate with via the network medium 16 is the data source 12. It will be understood that other location in the network architecture for the data source 12 are possible. As an example of another location of the data source 12, the data source 12 may be a server on the Internet for streaming services that are not managed by a wireless network operator.

The UE 14 may be any kind of electronic device that receives a data stream via a wireless interface 18 (e.g., a 3GPP wireless modem). Exemplary UEs 14 include, but are not limited to, a smart phone, a tablet computer, a desktop or laptop computer, a virtual reality headset, an augmented reality device, a wearable computer, etc.

The data source 12 may include operational components for carrying out wireless communications and other functions of the data source 12. For instance, the data source 12 may include a control circuit 20 that is responsible for overall operation of the data source 12, including controlling the data source 12 to carry out the operations applicable to the data source 12 and described in greater detail below. The control circuit 20 includes a processor 22 that executes code 24, such as an operating system and/or other applications. The functions described in this disclosure document and applicable to the data source 12 may be embodied as part of the code 24 or as part of other dedicated logical operations of the data source 12. The logical functions and/or hardware of the data source 12 may be implemented in other manners depending on the nature and configuration of the data source 12. Therefore, the illustrated and described approaches are just examples and other approaches may be used including, but not limited to, the control circuit 20 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 24 and any stored data (e.g., data associated with the operation of the data source 12) may be stored on a memory 26. The code 24 may be embodied in the form of executable logic routines (e.g., a software program) that are stored as a computer program product on a non-transitory computer readable medium (e.g., the memory 26) of the data source 12 and are executed by the processor 22. Memory 26 can also store the data that makes up the data stream. The functions described as being carried out by the data source 12 may be thought of as methods that are carried out by the data source 12.

The memory 26 may be, for example, one or more of a buffer, a flash memory, a hard drive, a removable media, a volatile memory, a non-volatile memory, a random access memory (RAM), or other suitable device. In a typical arrangement, the memory 26 includes a non-volatile memory for long term data storage and a volatile memory that functions as system memory for the control circuit 20. The memory 26 is considered a non-transitory computer readable medium.

The data source 12 includes communications circuitry that enables the data source 12 to establish various communication connections. For instance, the data source 12 may have a network communication interface 28 to communicate with the network medium 16.

The UE 14 may include operational components for carrying out various functions of the UE 14 including wireless communications with the base station 30 and any other devices with which the UE 14 may communicate. One function of the UE 14 is network assisted data streaming as will be described in greater detail. Among other components, the UE 14 may include a control circuit 32 that is responsible for overall operation of the UE 14, including controlling the UE 14 or an associated client to carry out the operations described in greater detail below. The control circuit 32 includes a processor 34 that executes code 36, such as an operating system and/or other applications. The functions described in this disclosure document may be embodied as part of the code 36 or as part of other dedicated logical operations of the UE 14. The logical functions and/or hardware of the UE 14 may be implemented in other manners depending on the nature and configuration of the UE 14. Therefore, the illustrated and described approaches are just examples and other approaches may be used including, but not limited to, the control circuit 32 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 36 and any stored data (e.g., data associated with the operation of the UE 14) may be stored on a memory 38. The code 36 may be embodied in the form of executable logic routines (e.g., a software program) that are stored as a computer program product on a non-transitory computer readable medium (e.g., the memory 38) of the UE 14 and are executed by the processor 34. The functions described as being carried out by the UE 14 may be thought of as methods that are carried out by the UE 14.

The memory 38 may be, for example, one or more of a buffer, a flash memory, a hard drive, a removable media, a volatile memory, a non-volatile memory, a random access memory (RAM), or other suitable device. In a typical arrangement, the memory 38 includes a non-volatile memory for long term data storage and a volatile memory that functions as system memory for the control circuit 32. The memory 38 is considered a non-transitory computer readable medium.

The UE 14 includes communications circuitry that enables the UE 14 to establish various communication connections. For instance, the UE 14 includes the wireless interface 18 over which wireless communications are conducted with the base station 30. Other communications may be established with the UE 14, such as Wi-Fi communications, wired connections, etc. The wireless interface 18 may include a radio circuit having one or more radio frequency transceivers (also referred to as a modem), at least one antenna assembly, and any appropriate tuners, impedance matching circuits, and any other components needed for the various supported frequency bands and radio access technologies.

Other components of the UE 14 may include, but are not limited to, user inputs (e.g., buttons, keypads, touch surfaces, etc.), a display 40, a microphone, a speaker, a sensor, a jack or electrical connector, a rechargeable battery and power supply unit, a SIM card, a motion sensor (e.g., accelerometer or gyro), a GPS receiver, and any other appropriate components. In particular, the UE 14 may include a display 40 with all appropriate display components, as well as components such as a video processor, video and audio decoders, etc. The display 40 can be, for example, a headset, a display screen on a smartphone, tablet, computer, or laptop, an augmented reality screen, or a wearable device such as an optical head-mounted display, among others.

The network system 10 may include a device that provides network assistance services to the UE 14 and/or the data source 12 during data streaming. As used herein, the term network element is defined as any device on a network that can provide network assistance services. For ease of description, the network assistance device will be referred to as a DASH-aware network element (DANE) 42. While DASH refers to dynamic adaptive streaming over hypertext transfer protocol (HTTP), the DANE 42 may provide a network assistance service to data streaming that is carried out according to additional and/or other protocols, such as HTTP live streaming (HLS), real time transmission protocol (RTP), real time messaging protocol (RTMP), etc.

The DANE 42 may include operational components for carrying out various functions of the DANE 42 including providing network assistance services to the UE 14 and/or data source 12. Among other components, the DANE 42 may include a control circuit 44 that is responsible for overall operation of the DANE 42, including controlling the DANE 42 to carry out the operations described in greater detail below. The control circuit 44 includes a processor 46 that executes code 48, such as an operating system and/or other applications. The functions described in this disclosure document may be embodied as part of the code 48 or as part of other dedicated logical operations of the DANE 42. The logical functions and/or hardware of the DANE 42 may be implemented in other manners depending on the nature and configuration of the DANE 42. Therefore, the illustrated and described approaches are just examples and other approaches may be used including, but not limited to, the control circuit 44 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 48 and any stored data (e.g., data associated with the operation of the DANE 42) may be stored on a memory 50. The code 48 may be embodied in the form of executable logic routines (e.g., a software program) that are stored as a computer program product on a non-transitory computer readable medium (e.g., the memory 50) of the DANE 42 and are executed by the processor 46. The functions described as being carried out by the DANE 42 may be thought of as methods that are carried out by the DANE 42.

The memory 50 may be, for example, one or more of a buffer, a flash memory, a hard drive, a removable media, a volatile memory, a non-volatile memory, a random access memory (RAM), or other suitable device. In a typical arrangement, the memory 50 includes a non-volatile memory for long term data storage and a volatile memory that functions as system memory for the control circuit 44. The memory 50 is considered a non-transitory computer readable medium.

The DANE 42 includes communications circuitry that enables the DANE 42 to establish various communication connections. For instance, the DANE 42 includes a network interface 52 over which communications may be conducted with the data source 12, the UE 14 and any other devices via the network medium 16.

In the illustrated embodiment, the network assistance DANE 42 is implemented as a server that is out-of-band of the media delivery path of the content transmitted over the data stream from data source 12 to the UE 14. With an out-of-band architecture it is possible that the communication between the UE 14 and the DANE 42 is independent of communication between the UE 14 and the data source 12. Therefore, communications between the UE 14 and the DANE 42 may occur in a separate communication path and/or data link than the communication path and/or data link used for the streaming of data. As such, the DANE 42 may be provided at various locations in the network system 10. For example, the DANE 42 may communicate with the UE 14 through the base station 30 as illustrated, through a different base station, or directly with the UE 14. In another embodiment, the functionality of the DANE 42 may be made part of another network node in the operator controlled network, or outside of the operator network, e.g. connected to or part of the data source 12.

C. Network Assistance for Dynamic Streaming of Multi-Segment Data

Signaling

Only the most germane aspects of the described signaling paths are described in this disclosure since the person of ordinary skill in the art will understand how to implement remaining details.

A first signaling path relates to modem communication between the wireless interface 18 in the UE 14 (e.g., cellular modem) and the cellular network. This may include radio communications between UE 14 and the base station 30, as well as general control signaling between UE 14 and core network nodes.

A second signaling path relates to application communication between the UE 14 (e.g., by the streaming client) and the data source 12. This may be considered application data and includes the data (e.g., audiovisual content and/or other media content included in the data stream) that is transferred, often in segments or as a continuous stream, and related control signaling (e.g., HTTP DASH or other segment flow control). This signaling path may be made in accordance with a DASH/HTTP protocol, an HLS protocol, an RTP protocol, an RTMP protocol, or other protocol for media delivery between a data source and a streaming client. As will be described, related to the data transfer of segments from data source 12 to client 54, this disclosure proposes assigning priorities, at the client 54, to individual segments of the streamed data, transmitting such priority information indicative of the difference in priority between at least two different segments, where this transmission may be done via a third signaling path between a client and a DANE. Further, this disclosure proposes indicating recommended rates from the DANE for at least one of the assigned multiple priorities.

The term recommended rate as used herein can mean any suitable rate level, which in different implementations/embodiments could have different meaning. For example, the term recommended rate can be used to describe a recommended media rate, a recommended link data rate, or a recommended transmission data rate, among others.

Figure 2:
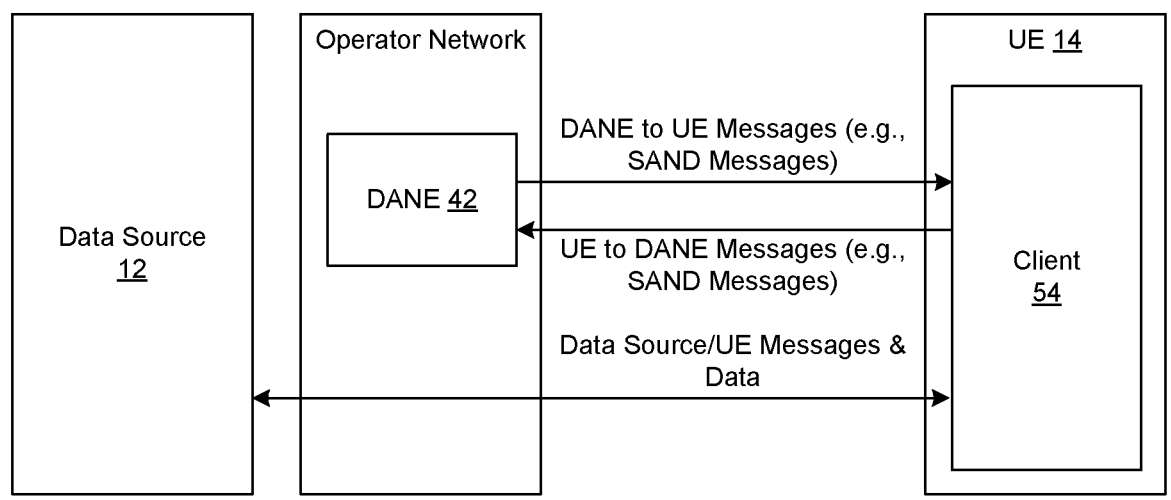
FIG. 2 is a representative high-level architectural diagram of multi-segment data streaming assistance.

FIG. 2 is a high-level architectural diagram of network assistance that shows some of these signal flows and may be referenced in connection with the following descriptions as a representative approach to network assistance (NA).

In one embodiment, to assist in providing an improved quality of experience for the data streaming, a signaling path is established as part of a network assistance (NA) session with a network assistance service of the network. Therefore, to implement NA functions, a signaling approach between the UE 14 and the DANE 42 may be established. In one embodiment this NA signaling approach is established between the streaming client 54 and the DANE 42. It should be appreciated that although UE 14 and client 54 are used interchangeably with respect to communications with the NA service and the data source 12, the client 54 may reside on the UE 14 or on a separate computing device.

In one embodiment, the disclosed NA functions may use message envelopes employed by existing standards and descriptions, but with appropriate modifications for support of multi-segment streaming. For example, the moving picture experts group (MPEG) server and network assisted DASH (SAND) promulgates a general approach to network assistance for supporting the transmission of streamed content from a network to a client 54 over a downlink. For instance, network assistance that is provided by a DANE may be applied to media content in the 3GPP DASH format. In one embodiment, the present techniques add novel functions and message types to the NA protocol that provide relevant information to the network to enhance multi-segment data streaming from the data source 12 to the client 54.

General Operation

The above system architecture and signaling paths can be utilized as part of a network assistance service to Improve the quality of service for streaming data streams comprised of multiple data segments. In certain situations, one or more data segments that are part of the data as whole are more important than other data segments. In these situations, quality of service for streaming the data can be improved by prioritizing the more important data segments. The data segments with higher priorities can be assigned a higher recommended rate than data segments with lower priorities. In this manner, higher priority segments can be downloaded at a higher quality and/or with lower latency.

Various functions are included as part of a network assistance concept to enhance multi-segment data streaming. A new content alert function allows a client 54 to inform the network assistance service (e.g. at the DANE 42) that a streaming client 54 is immediately requesting one or more new data segments from the data source 12. This function can be used when the client 54 has nothing buffered for the relevant data segment, and therefore initiates a request to get the highest possible priority for the data segment and/or the client's communications.

A segment priority notification function can be used by the client 54 to inform a network assistance service about the relative priority of an upcoming data segment download. When multiple segments are requested simultaneously, the client 54 can inform the network assistance service what type of priority level data segments have among the data that is to be requested from the data source 12. This can be useful to inform the network assistance service of higher priority data segments that need to be provided to the client 54 at a higher quality of service, e.g. a higher transmission data rate, and/or a low latency.

A multisegment rate recommendation function can be used for a network assistance service to provide recommended rates (e.g. media rate recommendations) to the client 54 for multiple simultaneously downloaded segments. The data source 12 may be able to deliver multiple alternative data segments corresponding to different media rates to the client, for example, where different segments include data for the same time period of the content, but are encoded with different data resolutions. Such time period, or segment duration, may be in the order of one second or a number of seconds.

Hence, since a high resolution video stream may consume more data than a low resolution video stream, a segment corresponding to a higher video resolution may be larger in terms of data size (e.g. counted in bytes of data), compared to a segment for the same time period corresponding to a lower video resolution. Similar difference can be noted for other variations in the streaming content such as for variations in the audio quality, variations in the viewing window size etc.

Since the segment data size measured in bytes corresponds to a certain media time period in seconds, each segment may therefore correspond to a certain media rate (e.g. in bytes per second of content viewing time). This media rate is different in its definition compared to the transmission data rate of the segments from the data source 12 to the client 54.

It can be noted that if playing a media in a client 54 during video streaming while the media rates of the requested segments from the data source are larger than the transmission data rates, the amount of data available in the client buffer may be reduced over time. On the other hand if, for the same scenario, the media rates are lower than the transmission data rates, the amount of data available in the client 54 may be increased over time.

A client 54 optimizing its viewing experience for a user may therefore try to prioritize and select segments, from the available segment variants, with total media rate being close to, but lower than the aggregated transmission data rate, in order to receive as much content as possible with as high quality levels as possible, while still maintaining data available in the client content buffer.

Within the multisegment media rate recommendation function, the network assistance function may provide rate recommendations indicative of, for example, one or more suggested media rates to the client. Further, the client 54 may use the one or more recommended media rates when selecting segment representations to request from the data source 12.

The rate recommendations can be provided to the client 54 as a response message to the segment priority notification. For example, using this function, the network assistance service can provide a first recommended rate to a high priority segment, a second recommended rate to a medium priority segment, and a third recommended rate to a low priority segment.

A further feature involves a network assistance service that can inform the client 54 about the availability of a different quality of service level for the communication, such as the availability of ultra-reliable low latency communication (URLLC). The network assistance service can provide a specific access point name, a quality of service indicator, an IP address, a mobile cell ID or similar type of network resource which is allocated to all or parts of the upcoming radio communication related to the data stream session. This could be controlled by the network to accommodate an application on the client 54 to use low latency communication. Specifically, the network assistance service could indicate that certain messages are allowed to be sent on the higher quality of service (QoS) level. For example, the network assistance service and/or the client 54 can be permitted to transmit new content alert function messages on the higher QoS level. In this way the client 54 can notify the network of this information with the lowest available latency. Alternatively, or in addition, the network assistance service can allow low latency high priority communication for the client-to-data source communication in one or both directions. Such communications can include, for example, requesting or delivering new data segments. As a further example, the URLLC communication can be permitted when downloading new segments after a new content alert.

Figure 3:
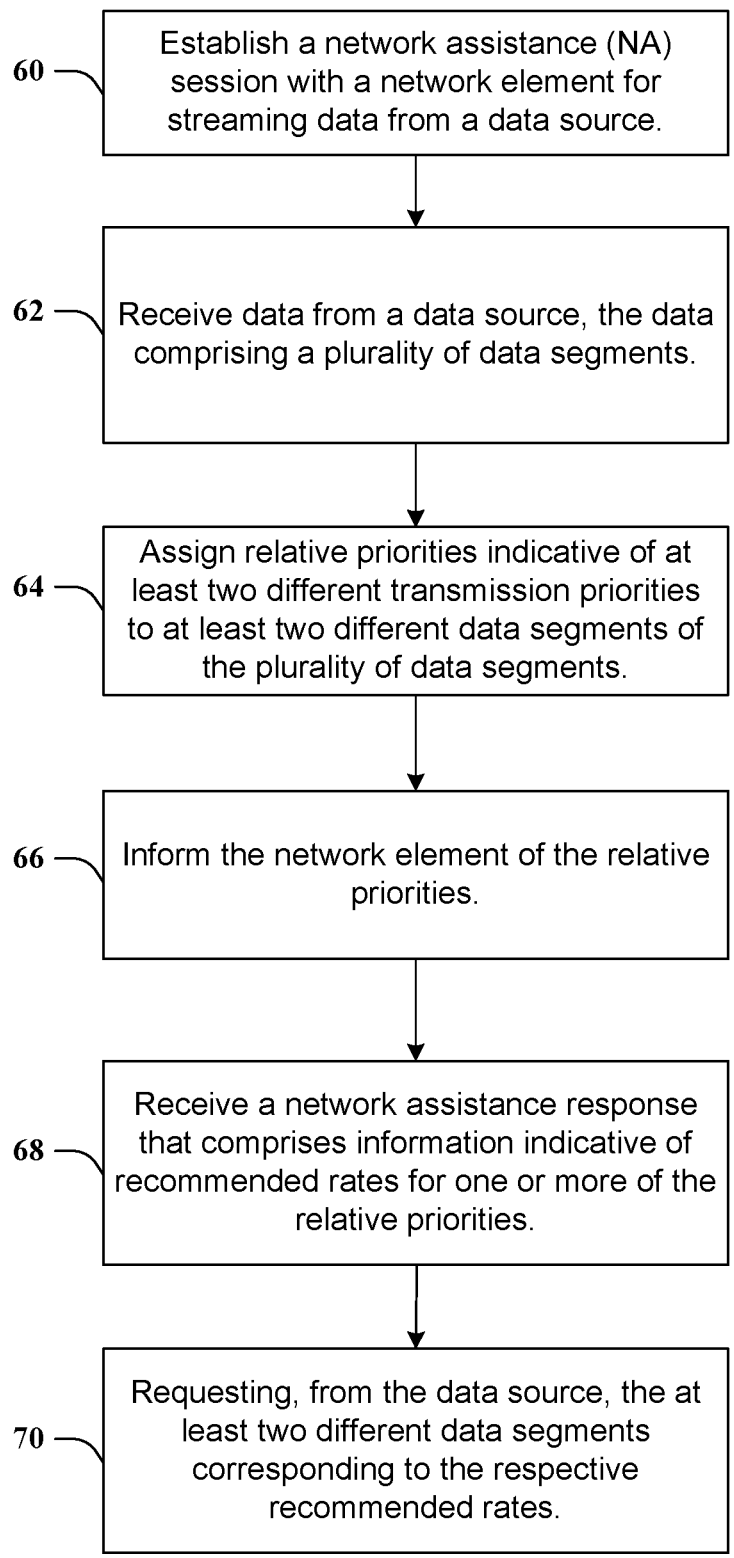
FIG. 3 is a flow diagram of a representative method of receiving a data stream using network assistance.

Turning now to FIG. 3, a method is displayed in which a streaming client receives network assistance (NA) from a network assistance service. At block 60, the streaming client 54 establishes a network assistance session with a network assistance service of the network. In one embodiment, the network assistance service is provided by DANE 42. At block 62, the client 54 receives data from a data source 12. The data received by the client 54 can include a plurality of data segments. In certain embodiments, each data segment can be available from the data source in different versions. The different versions of each segment can correspond to different data rates and/or video quality levels. For example, a first version of a data segment can have a 480p video quality level, a second version of the data segment can have a 720p video quality level, and a third version of the data segment can have a 1080p video quality level.

At block 64, the streaming client 54 assigns relative priorities indicative of at least two different transmission priorities to at least two different data segments of the plurality of data segments. For example, a first data segment can be assigned a high priority based on its importance with respect to the data as a whole or the client's need in receiving the segment at a high quality of service and/or over low latency communication. On the other hand, a second data segment can be assigned a low priority due to the second data segment having a low importance with respect to the data as a whole. At block 66, the streaming client 54 sends the relative priorities to the NA service. After receiving the relative priorities from the client 54, the NA service assigns a recommended rate for at least one of the relative priorities. In certain embodiments, the NA service assigns a recommended rate for multiple relative priorities. In these embodiments, the NA service assigns a higher recommended rate for higher relative priorities. For example, the NA service can assign a high media rate to a high relative priority and a low media rate to a low relative priority.

At block 68, the streaming client 54 receives a NA response that includes information indicative of the recommended rates for one or more of the relative priorities. At block 70, the streaming client 54 requests, from the data source, the at least two different data segments corresponding to the respective recommended rates provided in the NA response by the NA service.

In certain embodiments, the client 54 can determine that an upcoming data segment needs to be downloaded immediately and that a high priority request should be sent to the data source 12 for the upcoming data segment. In this situation, the client 54 can assign a highest priority to the upcoming data segment. Upon receiving the highest priority indication from the client 54, the NA service can respond with a recommended rate for the upcoming data segment. Along with the recommended rate for the upcoming data segment, the NA service can respond to the client 54 with an acknowledgment that indicates whether or not the recommended rate for the upcoming data segment is a highest recommended rate or corresponding to a highest priority of transmission, in response to the highest priority assignment.

Figure 4:
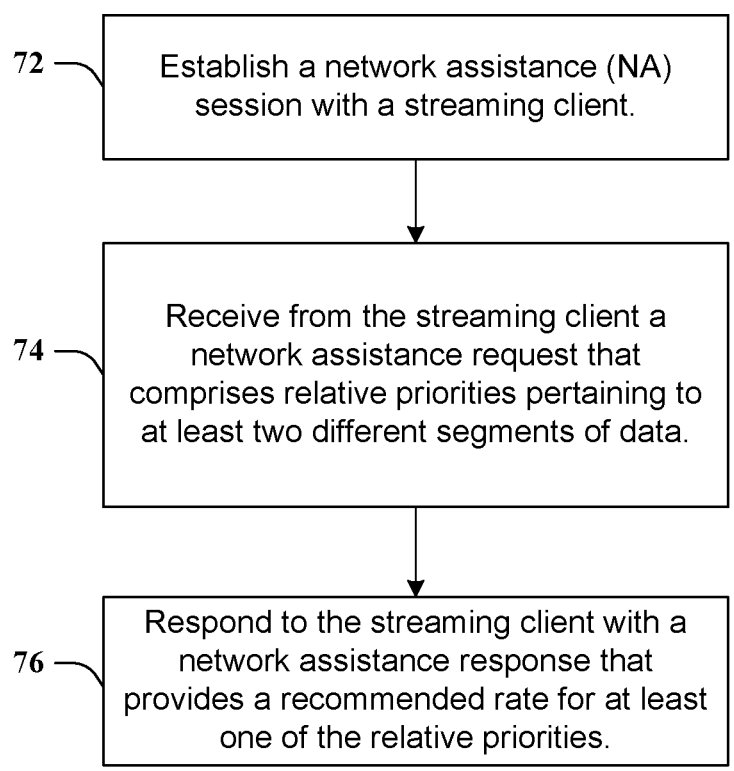
FIG. 4 is a flow diagram of a representative method of providing network assistance for a data stream.

Turning now to FIG. 4, a method is displayed in which a NA service provides network assistance to a streaming client 54. At block 72, the NA service establishes a network assistance session with a streaming client 54. At block 74, while the client is streaming the data for one or more segments of data, the NA service receives from the streaming client a network assistance request that includes relative priorities pertaining to at least two different segments. At block 76, the NA service responds to the streaming client 54 with a NA response that provides a recommended rate for at least one of the relative priorities.

Application to Streaming Virtual Reality Data

Figure 5:
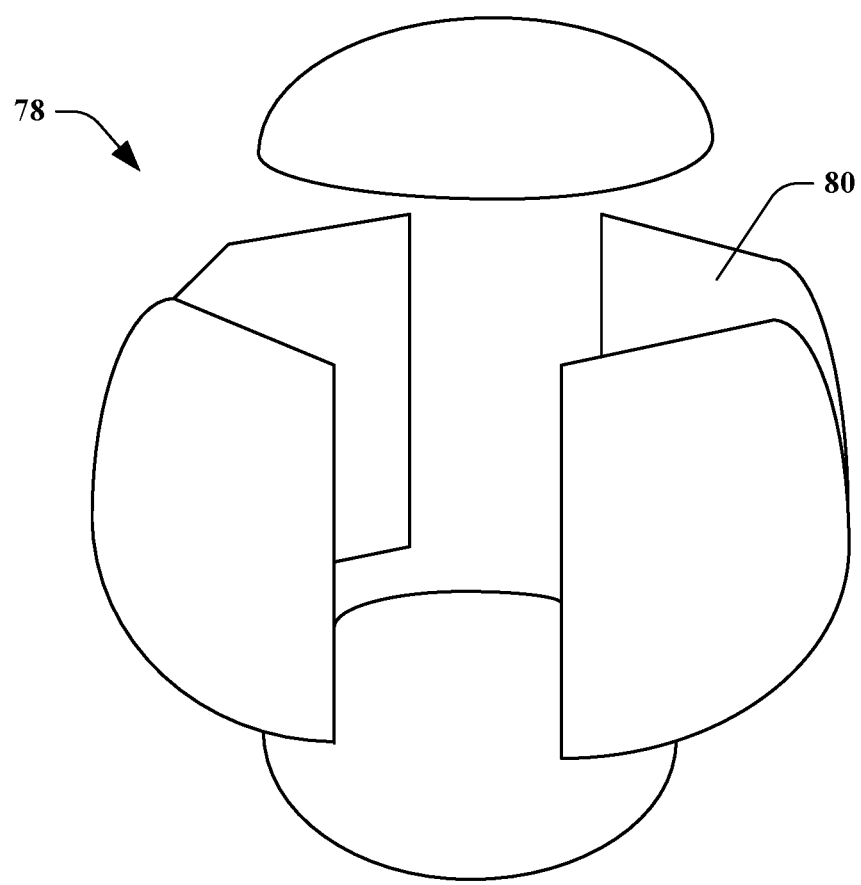
FIG. 5 is an overall view of a representative virtual reality environment.

In certain embodiments, data from a data source 12, represents a virtual reality environment 78 that can include a plurality of tiles 80, as shown in FIG. 5. The data can include a plurality of data segments, with each data segment representing a tile 80. A user that views the virtual reality environment 78 will not be able to consume or view the complete spherical 360-degree content at the same time because the user has a limitation of a field of view (FOV) that is viewable to the user. In some embodiments, the user can observe a certain part of the current FOV with high details and can also observe other parts of the FOV with a lower level of detail. In order to limit the required data to be distributed over the network, the data stream to the client 54 can be restricted to include only the data segments representing tiles 80 that make up the user's current FOV. Therefore, the necessary tiles needed in the client's buffer are dependent on the user's current FOV.

In one example, relative priorities are assigned to data segments based on a user's field of view (FOV) with respect to the VR environment 78. For example, a client 54 can assign a first priority to a data segment representative of an in-FOV tile that is in the immediate view of the user. The in-FOV tile can have higher detail due to its center of focus in the user's FOV. Further, the client 54 can assign a second priority to a data segment representative of a peripheral FOV tile that is viewable, but not in the immediate view of the user. In certain embodiments, the client 54 can assign a third priority to a data segment representative of an out-of-view tile. The client 54 sends a network assistance request including these priorities to a NA service. The NA service receives the network assistance request, and responds to the client 54 with a network assistance response that provides a recommended media rate for at least one of the priorities. In certain embodiments, recommended media rates include a first recommended media rate corresponding to the first priority, a second recommended media rate corresponding to the second priority, and a third recommended media rate corresponding to the third priority. The first recommended media rate corresponds to higher quality video and/or a faster data rate than the second recommended media rate, and the second recommended media rate corresponds to higher quality video and/or a faster data rate than the third recommended media rate.

In a situation where a user is viewing a virtual reality environment, the user may change the FOV by, for example, turning the user's head. When the user's FOV is changed, new tiles will be needed to complete the new FOV. When these new tiles are not currently available in the client's buffer, these new tiles need to be downloaded from the data source 12. Accordingly, the client 54 can use the new content alert function to assign the highest possible priority for the new tile and send this highest possible priority to the NA service to request a corresponding recommended rate. In response to receiving the highest possible priority from the client, the NA service can provide a recommended rate that corresponds to the highest possible priority. Along with the recommended rate, the NA service can also send an acknowledgment message to inform the client whether or not the highest available rate has been assigned in response to the new content alert request.

D. Conclusion

Although certain embodiments have been shown and described, it is understood that equivalents and modifications falling within the scope of the appended claims will occur to others who are skilled in the art upon the reading and understanding of this specification.

What is claimed is:

1. A method of streaming data with a streaming client, comprising:
    establishing a network assistance (NA) session with a network element for streaming data from a data source;
    receiving data from the data source, the data comprising a plurality of data segments, wherein the data represents a virtual reality (VR) environment, and each segment of the plurality of segments represents a tile of the VR environment;

assigning relative priorities indicative of at least two different transmission priorities to at least two different data segments of the plurality of data segments, wherein the relative priorities are assigned based on a user's field of view (FOV) with respect to the VR environment, and assigning relative priorities comprises assigning at least one of a first priority corresponding with a first recommended rate to an in-FOV tile, a second priority corresponding with a second recommended rate to a peripheral FOV tile, or a third priority corresponding to a third recommended rate to an out of FOV tile, wherein the first recommended rate corresponds to higher quality video than the second recommended rate, and the second recommended rate corresponds to higher quality video than the third recommended rate; and informing the network element of the relative priorities.

2. The method of claim 1, further comprising receiving a network assistance response that comprises information indicative of recommended rates for one or more of the relative priorities.

3. The method of claim 2, further comprising requesting, from the data source, the at least two different data segments corresponding to the respective recommended rates.

4. The method of claim 1, further comprising:
assigning a highest priority indicative of a highest priority request for an upcoming data segment reception; and
receiving a recommended rate for the upcoming data segment.

5. The method of claim 4, further comprising receiving an acknowledgement message indicating whether the recommended rate for the upcoming data segment was assigned as a highest available rate by the network element in response to the highest priority request.

6. The method of claim 1, further comprising receiving information specifying an allocation of network resources dedicated for at least one of communication with the network element or downloading the data.

7. The method of claim 6, wherein the information specifying an allocation of network resources comprises at least one of an access point name, a quality of service indicator, an IP address, a mobile cell ID, or a radio access technology.

8. The method of claim 1, wherein the network element is configured to provide a NA service that supports network assistance under dynamic adaptive streaming over hypertext transfer protocol (HTTP) (DASH), the network element being a DASH-aware network element (DANE).

9. A user equipment comprising a wireless interface and a control circuit configured to:
establish a network assistance (NA) session with a network element for streaming data from a data source;
receive data from the data source, the data comprising a plurality of data segments, wherein the data represents a virtual reality (VR) environment, and each segment of the plurality of segments represents a tile of the VR environment;
assign relative priorities indicative of at least two different transmission priorities to at least two different data segments of the plurality of data segments, wherein the relative priorities are assigned based on a user's field of view (FOV) with respect to the VR environment, and the control circuit is configured to assign relative priorities by assigning at least one of a first priority corresponding with a first recommended rate to an in-FOV tile, a second priority corresponding with a second recommended rate to a peripheral FOV tile, or a third priority corresponding to a third recommended rate to an out of FOV tile, wherein the first recommended rate corresponds to higher quality video than the second recommended rate, and the second recommended rate corresponds to higher quality video than the third recommended rate; and inform the network element of the relative priorities.

10. A method of providing network assistance (NA) by a network element during streaming of data from a data source to a streaming client (54), comprising:
establishing a network assistance (NA) session with the streaming client;
receiving from the streaming client a network assistance request that comprises relative priorities pertaining to at least two different segments of data, wherein the data represents a virtual reality (VR) environment, and each segment of the one or more segments represents a tile of the VR environment, and wherein the relative priorities correspond to a user's field of view (FOV) with respect to the VR environment; and
responding to the streaming client with a network assistance response that provides a recommended rate for at least one of the relative priorities, wherein the recommended rate associates at least one of a first recommended rate with an in field of view (FOV) tile, a second recommended rate with a peripheral FOV tile, or a third recommended rate to an out of FOV tile, wherein the first recommended rate corresponds to higher quality video than the second recommended rate, and the second recommended rate corresponds to higher quality video than the third recommended rate.

11. The method of claim 10, further comprising:
receiving a highest priority request for an upcoming data segment; and
responding to the highest priority request with a recommended rate for the upcoming data segment.

12. The method of claim 11, wherein responding to the high priority request includes sending an acknowledgement message indicating whether the recommended rate for the upcoming data segment was assigned as a highest available rate in response to the highest priority request.

13. The method of claim 10, further comprising providing the streaming client with information specifying an allocation of network resources dedicated for at least one of communication with the network element or downloading the data.

14. The method of claim 13, wherein the information specifying an allocation of network resources comprises at least one of an access point name, a quality of service indicator, an IP address, a mobile cell ID, or a radio access technology.

15. The method of claim 10, wherein the network element is configured to provide a NA service that supports network assistance under dynamic adaptive streaming over hypertext transfer protocol (HTTP) (DASH), the network element being a DASH-aware network element (DANE).

* * * * *